US010389795B2

(12) United States Patent
Dias et al.

(10) Patent No.: US 10,389,795 B2
(45) Date of Patent: Aug. 20, 2019

(54) DISTRIBUTED EXTENSION EXECUTION IN COMPUTING SYSTEMS

(71) Applicant: Microsoft Technology Licensing, LLC, Redmond, WA (US)

(72) Inventors: Alvaro Dias, Bellevue, WA (US); Brad Olenick, Kirkland, WA (US); Julio Casal Terreros, Redmond, WA (US); Marck Robinson, Kirkland, WA (US); Madhur Joshi, Kirkland, WA (US); Yu Zhao, Redmond, WA (US); Vinela Pothineni, Redmond, WA (US); Wissam Zeidan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 561 days.

(21) Appl. No.: 15/040,188

(22) Filed: Feb. 10, 2016

(65) Prior Publication Data

US 2017/0104814 A1 Apr. 13, 2017

Related U.S. Application Data

(60) Provisional application No. 62/239,388, filed on Oct. 9, 2015.

(51) Int. Cl.
*G06F 15/16* (2006.01)
*H04L 29/08* (2006.01)
*G06F 9/54* (2006.01)

(52) U.S. Cl.
CPC .............. *H04L 67/10* (2013.01); *G06F 9/54* (2013.01); *H04L 67/02* (2013.01); *H04L 67/141* (2013.01); *G06F 2209/509* (2013.01)

(58) Field of Classification Search
CPC ........ H04L 67/02; H04L 67/10; H04L 67/141
See application file for complete search history.

(56) References Cited

U.S. PATENT DOCUMENTS

| 6,393,605 | B1 | 5/2002 | Loomans |
| 6,560,607 | B1 | 5/2003 | Lassesen |
| 6,643,621 | B1 | 11/2003 | Dodrill et al. |

(Continued)

FOREIGN PATENT DOCUMENTS

EP 0853413 A2 * 7/1998 ............. H04L 69/12

OTHER PUBLICATIONS

"Second Written Opinion Issued in PCT Application No. PCT/US2016/054566", dated May 17, 2017, 10 Pages.

(Continued)

*Primary Examiner* — Jonathan A Bui
(74) *Attorney, Agent, or Firm* — Liang IP, PLLC

(57) ABSTRACT

Computing systems, devices, and associated processes for distributed execution of extensions are disclosed herein. In one embodiment, a method includes receiving a user input at a client device for initiating an extension in a web page associated with a web site. In response to the received user input, a communication link between the client device and a remote computing facility can be established. The method can also include transmitting a request for initiating the extension, from the client device, to the remote computing facility via the established communication link and receiving, at the client device, data representing execution results of the requested extension from the remote computing facility.

20 Claims, 8 Drawing Sheets

(56) References Cited

U.S. PATENT DOCUMENTS

| | | | |
|---|---|---|---|
| 7,409,349 | B2 | 8/2008 | Wang et al. |
| 7,567,359 | B2 | 7/2009 | Tameshige et al. |
| 7,568,205 | B2 | 7/2009 | Guthrie et al. |
| 8,051,180 | B2 | 11/2011 | Mazzaferri et al. |
| 8,719,365 | B1 | 5/2014 | Scheinost et al. |
| 8,826,411 | B2 | 9/2014 | Moen et al. |
| 2002/0065879 | A1 | 5/2002 | Ambrose et al. |
| 2003/0084091 | A1 | 5/2003 | Agarwalla et al. |
| 2008/0127234 | A1 | 5/2008 | Hesmer et al. |
| 2010/0058353 | A1 | 3/2010 | Turski |
| 2010/0082472 | A1* | 4/2010 | Cheung ............... G06Q 30/02 705/37 |
| 2010/0115023 | A1 | 5/2010 | Peled |
| 2010/0275025 | A1* | 10/2010 | Parkinson ............ H04L 9/0894 713/176 |
| 2013/0055070 | A1 | 2/2013 | Sacks et al. |
| 2013/0061128 | A1 | 3/2013 | Lucco et al. |
| 2013/0067503 | A1* | 3/2013 | Turski ................... G06F 9/54 719/330 |
| 2013/0086156 | A1 | 4/2013 | McFadzean et al. |
| 2013/0232506 | A1* | 9/2013 | Mazzoni ............... G06F 9/542 719/313 |
| 2014/0280509 | A1 | 9/2014 | Merrells |
| 2015/0244835 | A1* | 8/2015 | Fausak ................. H04L 67/08 709/203 |
| 2016/0057220 | A1* | 2/2016 | Gibbs ..................... G06F 8/65 709/203 |
| 2016/0057469 | A1* | 2/2016 | Morris ............. H04N 21/4312 725/25 |
| 2016/0299985 | A1* | 10/2016 | Poindessault ..... G06F 17/30864 |
| 2017/0139802 | A1* | 5/2017 | Hajiyev .............. G06F 11/3438 |

OTHER PUBLICATIONS

"Node.Js", Avilable at: <<https://nl.wikipedia.org/w/index.php?title=Node.js&oldid=44751806>>, Aug. 22, 2015, 2 Pages.

"International Search Report and Written Opinion Issued in PCT Application No. PCT/US2016/054566", dated Dec. 8, 2016, 12 Pages.

"Uniform Resource Locator", Available at:<<https://en.wikipedia.org/w/index.php?title=Uniform_Resource_Locator&oldid=291695>>, May 16, 2001, 1 Pages.

Liu, et al., "AASMP—Android Application Server for Mobile Platforms", In Proceedings of IEEE 16th International Conference on Computational Science and Engineering, Dec. 3, 2013, pp. 643-650.

"International Preliminary Report on Patentability Issued in PCT Application No. PCT/US2016/054566", dated Jan. 9, 2018, 10 Pages.

* cited by examiner

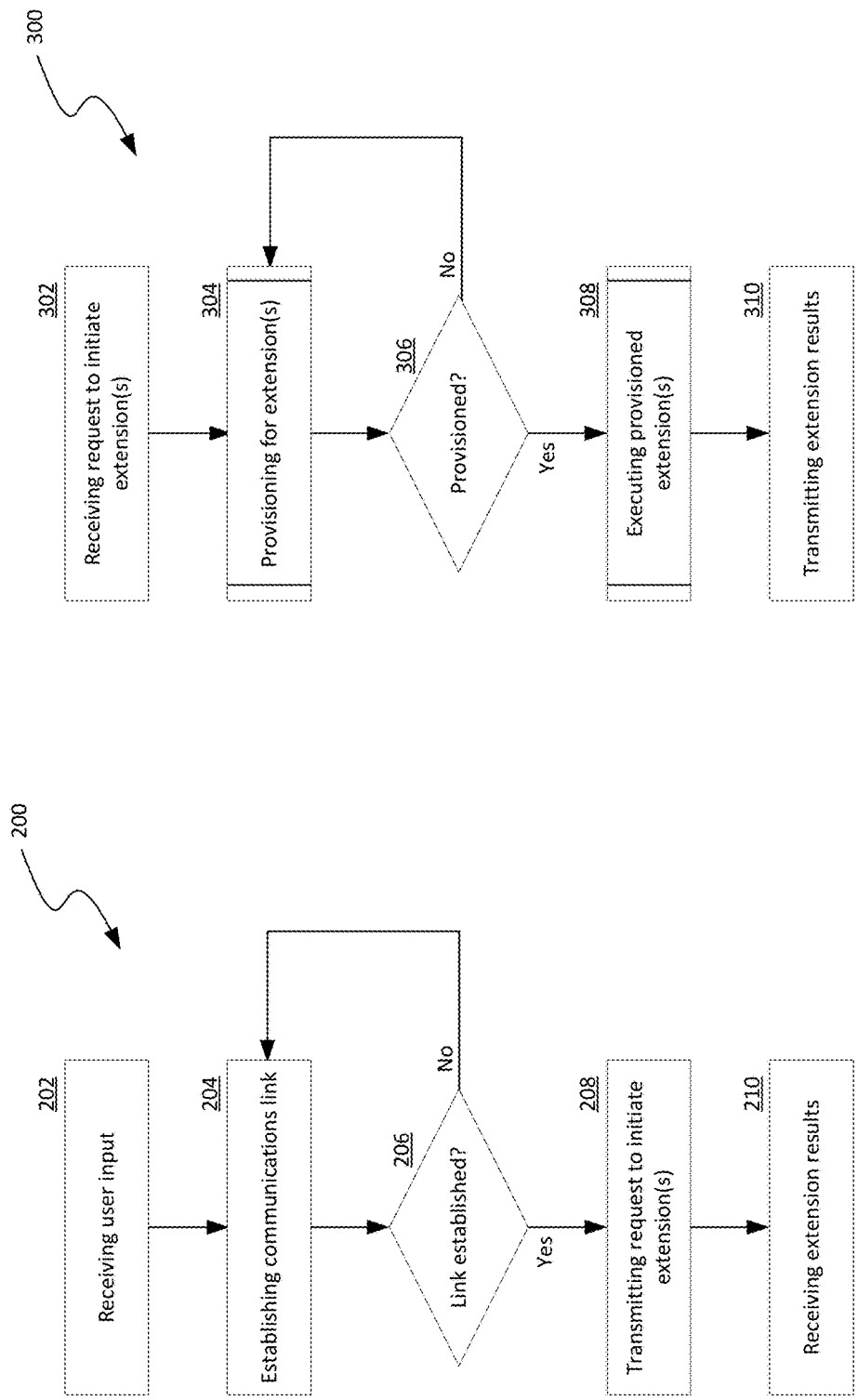

DISTRIBUTED EXTENSION EXECUTION IN COMPUTING SYSTEMS

CROSS-REFERENCE TO RELATED APPLICATION(S)

This application claims priority to U.S. Provisional Application No. 62/239,388, filed on Oct. 9, 2015.

BACKGROUND

Websites can often allow extensions that enable developers to write "apps" to run on a website in order to add administrative functionality or other features. These extensions can also be published to a site extensions gallery, which allows other users to install and use the extensions as well. Writing an extension can be generally similar to writing a regular website. One difference is how computer codes or instructions are installed on a website.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Website extensions are useful tools that can extend the functionality of a website in some way. Website extensions can be executed in a web browser on a client device as separate programs with corresponding HTML documents (commonly referred to as "iFrames") embedded inside a main HTML document of a website. During operation, in response to a user's request to start an extension, the web browser downloads codes of the extension from, for example, an extension server. The web browser can then execute the downloaded codes to, for example, retrieving content from the extension server or other suitable sources and processing the retrieved content to provide execution results.

The foregoing arrangement of extension execution can be difficult to scale and can lack execution flexibility. One limitation on the number of extensions is limited by a number of iFrames in the main HTML document. As the number of active extensions increases, the web browser consumes an ever increasing amount of network bandwidth, processor time, available memories, and other computing resources on the client device. As a result, performance of the client device can deteriorate to such a level that the web browser stops responding to user inputs. In some devices, such as smartphones or tablets, such extension execution may not even be possible due to a lack of computing resources.

Several embodiments of the disclosed technology can address at least some of the foregoing difficulties by relocating some or all of the extension execution to a remote computing facility such as computing clusters in a datacenter. For instance, in certain embodiments, the web browser on a client device can be configured to establish a communication link with a remote computing facility in response to a user input to initiate an extension of a web site. The browser can then transmit a request to the computing facility for initiating the extension. In response to receiving the request from the browser, the computing facility can perform various operations such as initiating a virtual machine on a server, downloading codes of the requested extension to the virtual machine, and execute the download codes on the virtual machine. The computing facility can then provide data as results of the extension execution to the browser on the client device. The browser can then display the received data to the user.

Several embodiments of the disclosed technology can have greatly improved scalability when compared to conventional techniques. The remote computing facility can include thousands or even millions of servers and other computing resources such that the number of extensions would not significantly impact the computing resources available in the computing cluster. Also, communications between the executed extensions and extension servers are now via network channels between the remote computing facility and the extension servers. Thus, such communications do not significantly impact the network bandwidth available at the client device. As a result, the browser at the client device can provide improved user experience than conventional techniques.

Several embodiments of the disclosed technology can also have improved execution flexibility when compared to conventional techniques. In certain embodiments, a user can designate whether one or more particular extension is to be executed locally on the client device or by the computing cluster. For example, when the user is developing an extension, for ease of debugging, the user can advantageously execute the extension codes locally. In another example, when the extension involves private or secure information, the user can have the extension executed locally. As a result, several embodiments of the disclosed technology can allow the user to flexibly execute desired extensions based on various user preferences, network conditions, etc.

BRIEF DESCRIPTION OF THE DRAWINGS

FIG. 6 is a flowchart showing a process of distributed extension execution at a client device in accordance with embodiments of the present technology.

FIGS. 7A-7C are flowcharts showing a process of distributed extension execution at an extension server in accordance with embodiments of the present technology.

DETAILED DESCRIPTION

Figure 1:
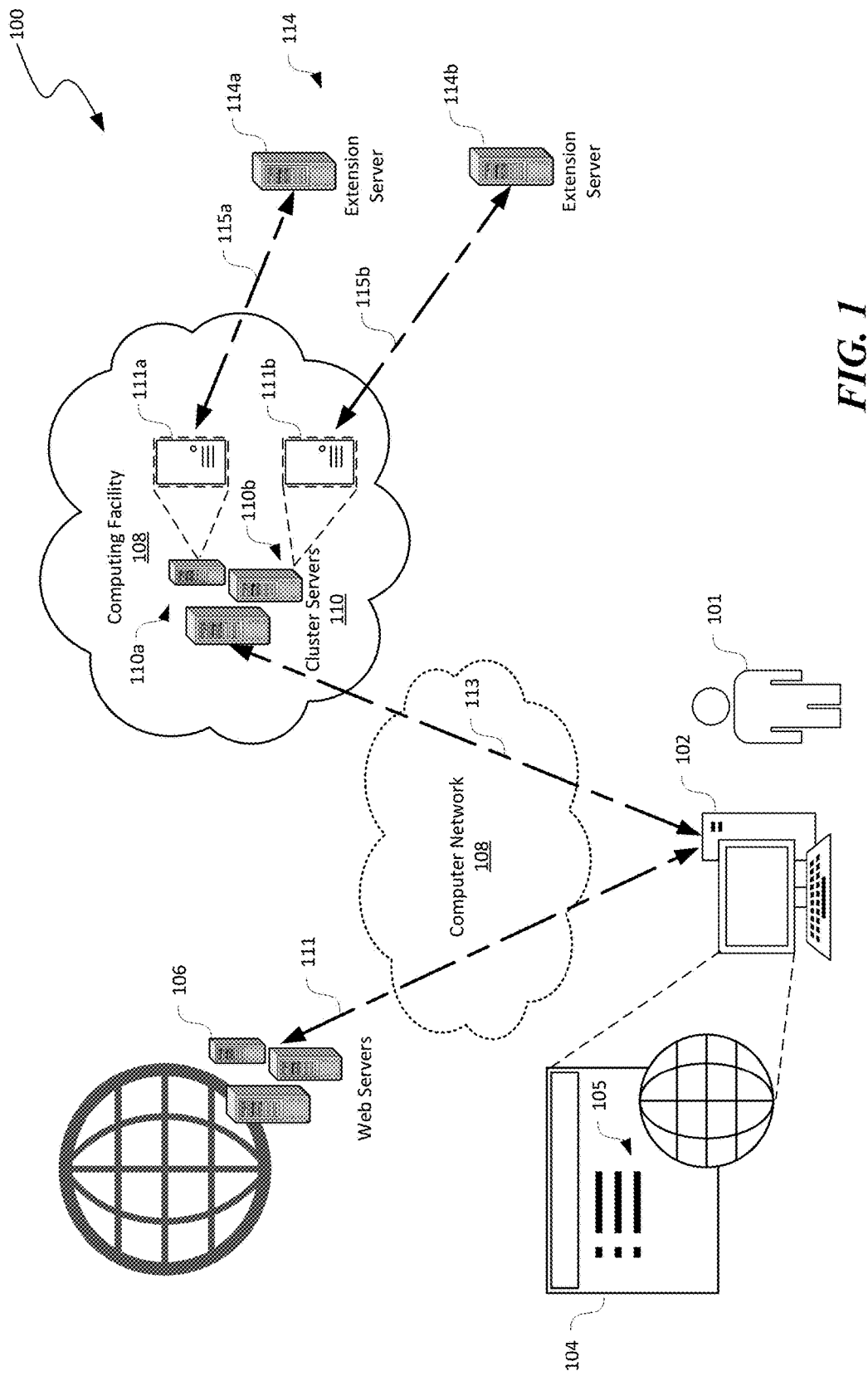
FIG. 1 is a schematic diagram of a computing system suitable for implementing distributed extension execution in accordance with embodiments of the present technology.

Certain embodiments of computing systems, devices, components, modules, routines, and processes implementing distributed extension execution are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-8.

As used herein, the term "extension" is a computer program having codes that extend the functionality of a website in some way. Extensions can be authored using HTML, JavaScript, CSS, or other web technologies. For example, extensions can extend functionality of a website (e.g., the Azure portal at "portal.azure.com") itself. At a basic level, an extension in the Azure portal provides a user a way to create, inspect, monitor, delete and configure some type of cloud assets or resources. The assets can include basic components, such as a virtual machine or public IP addresses, or a collection of assets working together such as a WordPress website (requiring a web server, VM, IP, certificate, database, authentication, etc.). Each of these assets or a collection of such assets can be managed using an extension.

Extensions can be added for any type of assets that require their own identity for billing, security, or management purposes. For example, an extension can be added for every type of databases (e.g., SQL Server, MySQL, Oracle, DocumentDB, etc.). Such extensions allow a great deal of autonomy for managing various assets and/or components of a website. Such extensions can also be placed in "sandboxes" so the extensions do not directly interact with one another. Website portal administrators can provide JavaScript or other suitable types of API to allow website owners or developers the ability to implement any desired logic. Website owners or developers can also provide a declarative user interface definition that describes how to integrate a user interface of an extension into that of the website. Such integration can allow the website to initialize one or more extension(s) as late as when the interface of the user is to be presented. As such, the number of extension(s) running and consuming computing/communications resources can be limited. Such integration can also allow the website to predictively initialize extension(s) in anticipation of using the extension(s) in the website. As a result, the extension(s) can be running and ready to accept user input when a user attempts to open the interface(s) of the extension(s).

Executing extensions in web browsers can be difficult to scale and lack execution flexibility. For example, a web browser can consume an increasing amount of network bandwidth, processor time, available memories, or other computing resources on a client device as the number of executed extensions increases. As a result, performance of the client device can significantly deteriorate and even becomes inoperable. Several embodiments of the disclosed technology is generally directed to relocating some or all of the extension execution to remote computing clusters. As such, execution of the extensions may not significantly impact available computing capability, communications bandwidths, or other resources at the client device, as described in more detail below with reference to FIGS. 1-7.

FIG. 1 is a schematic diagram of a computing system 100 suitable for implementing distributed extension execution in accordance with embodiments of the present technology. Several embodiments of the computing system FIG. 1 can improve performance and scalability of website extension execution by reducing an amount of client-side codes (e.g., JavaScript) executed on a client device. As shown in FIG. 1, the computing system 100 can include a client device 102, one or more web servers 106, a remote computing facility 108 having one or more cluster servers 110, and one or more extension servers 114 operatively coupled to one another via a computer network 108. The computer network 108 can include the Internet, a local area network, a metropolitan area network, a wide area network, and/or other suitable types of network.

The client device 102, the web servers 106, and the cluster servers 110, and the extension servers 114 can each include a processor and memory (not shown in FIG. 1) containing instructions for execution by the processor to provide certain software components discussed in more detail below with reference to FIGS. 2-4. The processor can include a microprocessor, a field-programmable gate array, and/or other suitable logic devices. The memory can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor (e.g., instructions for performing the methods discussed below with reference to FIGS. 5-7C). Even though particular components of the computing system 100 are shown in FIG. 1, in other embodiments, the computing system 100 can also include additional and/or different components. For example, the computing system 100 can include additional web servers, additional client devices, or other suitable components (not shown).

The client device 102 can be configured to execute instructions to provide a web browser 104 through which a user 101 can access content 105 (shown as a list for illustration) from the one or more web servers 106. The web browser 104 can be Mozilla Firefox provided by the Mozilla Corporation of Mountain View, Calif., Chrome Browser provided by Google Inc. of Mountain View, Calif., Safari provided by Apple Inc. of Cupertino, Calif., Internet Explorer or Microsoft Edge provided by Microsoft Corporation of Redmond, Wash., or other suitable types of web browser. In the illustrated embodiment, the client device 102 includes a desktop computer. In other embodiments, the client device 102 can also include a laptop, a tablet, a smartphone, or other suitable types of computing device.

The web servers 106 can be configured to host one or more websites accessible via the computer network 108. For example, the web servers 106 can be configured to provide text, video, picture, sound, or other suitable types of content to, for example, the client device 102 via a network connection 111 according to HTTP or another suitable network protocol. The web servers 106 can also be configured to provide an administrative website (referred herein as a "portable") through which an administrator or other suitable users can access, modify, or otherwise manage content and/or behavior of a website hosted on the web servers 106. One example portable can be the Azure portal at "portal.azure.com."

As shown in FIG. 1, the computing facility 108 can include one or more cluster servers 110. In one embodiment, the computing facility 108 can be a datacenter having a plurality of servers, storage devices, network devices, or other suitable devices interconnected by an Ethernet or other suitable types of network. In other embodiments, the computing facility 108 can include a portion of a datacenter, a rack of servers in a datacenter, a single server, or other suitable computing facilities. In the illustrated embodiment, the web servers 106 and the computing facility 108 are shown as separate entities. In other embodiments, a single datacenter or a portion thereof (not shown) can provide facilities for both the web servers 106 and the computing facility 108.

The cluster servers 110 can individually be configured to provision for and execute one or more extensions for a website such as the Azure portal upon a request from the client device 102. For example, as shown in FIG. 1, a first cluster server 110a can be configured to initiate a first virtual machine 112a, and a second cluster server 110b can be configured to initiate a second virtual machine 112b upon receiving a request from the client device 102 via a communication link 113. The communications link 113 can be a physical link or a logical link that uses one or more physical links. The communications link 113 can have a point-to-point, broadcast, multicast, point-to-multipoint, or other suitable types of operating mode.

The first and second cluster servers 110a and 110b can then be configured to download or otherwise retrieve codes, configuration data, metadata, or other suitable instructions that correspond to one or more extensions via the first and second extension links 115a and 115b, respectively. The first and second cluster servers 110a and 110b can then be configured to execute the downloaded instructions and provide execution results to the client device 102 via the communications link 113. In other embodiments, the one or more extensions can be provisioned for and/or executed on a single cluster server 110, a group of cluster servers 110, or in other suitable manners.

The extension servers 114 (identified individually as first and second extension servers 114a and 114b) are configured to provide codes and/or data associated with one or more extensions to a website. For example, in one embodiment, the first and second extension servers 114a and 114b can each include codes and data associated with a first extension and a second extension, respectively. In another embodiment, the first extension server 114a can include codes and the second extension server 114b can include data associated with both the first and second extensions. In other embodiments, a single extension server 114 can contain codes and data for multiple extensions. In further embodiments, one or more extension servers 114 can contain codes and/or data in other suitable manners.

As mentioned previously, the administrator or other suitable users can "extend" or increase functionalities of a website in some way by developing extensions for the website. For example, an extension for the Azure portal can allow a user to create, inspect, monitor, delete, or configure suitable types of cloud assets or resources, such as a virtual machine or public IP addresses, or a collection of such cloud assets working together. However, executing a large number of extensions in the web browser 104 on the client device 102 can consume a large amount of computing and/or network resources. As such, performance of the client device 102 can degrade and user experience can suffer as a result.

Several embodiments of the computing system 100 can address at least some of the foregoing drawbacks by relocating provisioning and execution of some or all of the extensions associated with a website to the computing facility 108. For example, in certain embodiments, the user 101 can start the web browser 104 on the client device 102 to access, for instance, the Azure portal at "portal.azure.com." In response, the client device 102 establishes the network connection 111 (e.g., a TCP/IP connection) with the web servers 106 via the computer network 108. The client device 102 can then retrieve the content 105 associated with the website and display the retrieved content 105 in the web browser 104.

In one embodiment, the user 101 can provide a user input to the client device 102 requesting remote execution of certain extensions to the website. In response to the received user input, the client device 102 can establish the communications link 113 with one or more cluster servers 110 in the computing facility 108. In other embodiments, the web browser 104 can automatically establish the communications link 113 based on one or more default extensions associated with the requested website. In further embodiments, the client device 102 can initiate remote execution of extensions based on functionality requests from the user 101, previous sessions of the website, user profiles, or other suitable criteria.

In certain embodiments, the computing facility 108 can require certain authorization credentials from the client device 102 before allowing the communications link 113 to be established. In one example, the client device 102 can use the same authorization credentials for accessing the website from the web servers 106 to establish the communications link 113. In other examples, the user 101 can provide passwords, answers to secure questions, or other credentials to the computing facility 108. In other embodiments, the computing facility 108 may be openly accessed without authorization credentials.

Once established, the client device 102 can utilize the communications link 113 to transmit a request for remote execution of one or more extensions (e.g., via metadata) in the computing facility 108. In response to receiving the request, one or more of the cluster servers 110 can provision for and execute codes of the requested one or more extensions. For example, as shown in FIG. 1, the first and second cluster servers 110a and 110b can each initiate a virtual machine 111a and 111b, respectively. The first and second cluster servers 110a and 110b can also initiate a browser emulator (not shown) in each of the first and second virtual machines 111a and 111b. The virtual machines 111a and 111b can then download codes for the one or more extensions from, for example, the first and second extension server 114a and 114b, respectively, and execute the downloaded codes using the browser emulator.

During execution, the one or more extensions executing in the browser emulators on the first and second virtual machines 111a and 111b can receive data (e.g., user input) from the web browser 104 on the client device 102 via the communications link 113. The one or more extensions can also access data from, for instance, the first and second extension servers 114a and 114b, respectively, or from other suitable sources. The first and second virtual machines 111a and 111b can then transmit data representing execution results of the one or more extensions to the client device 102 via the communications link 113. The client device 102 can then display the execution results in the web browser 104. In certain embodiments, the first and second extensions executing on the first and second virtual machines 111a and 111b can also communicate with each other via, for example, a virtual network (not shown) in the computing facility 108. In other embodiments, the first and second extensions can communicate via other suitable network channels.

Several embodiments of the computing system 100 can have greater scalability when compared to conventional techniques. The remote computing facility 108 can include thousands or even millions of cluster servers 110 and other computing resources such that a number of executed extensions would not significantly impact computing resources available in the computing facility 108. Also, data transmissions and other communications between the executed extensions in the computing facility 108 and the extension servers 114 are now via different network channels than the network connection 111 or the communications link 113. Thus, such communications do not significantly impact a network bandwidth available at the client device 102. As a result, the web browser 104 at the client device 102 can provide improved user experience than conventional techniques.

Figure 2:
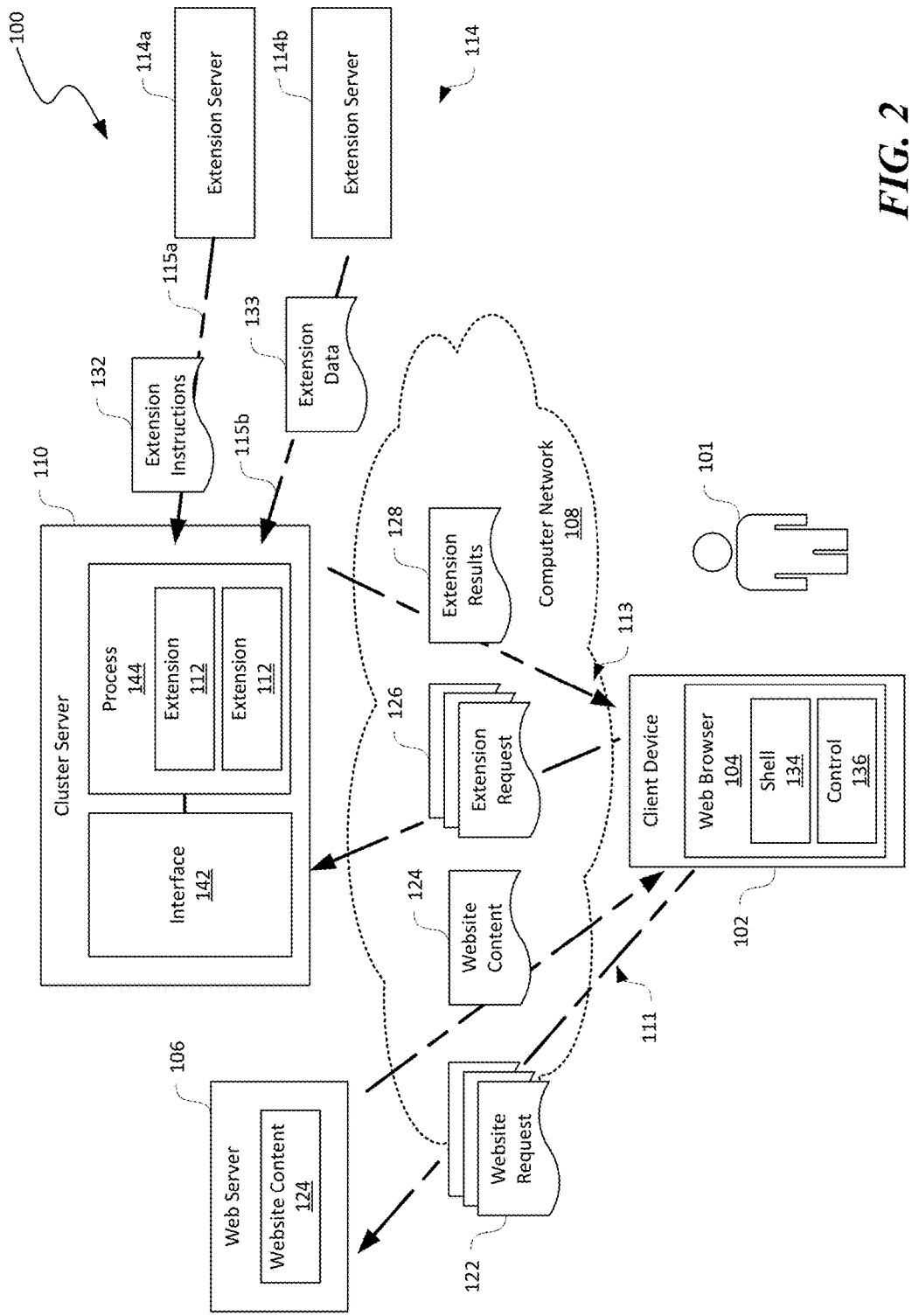
FIG. 2 is a schematic diagram showing certain components of the computing system in FIG. 1 in accordance with embodiments of the present technology.
Figure 3:
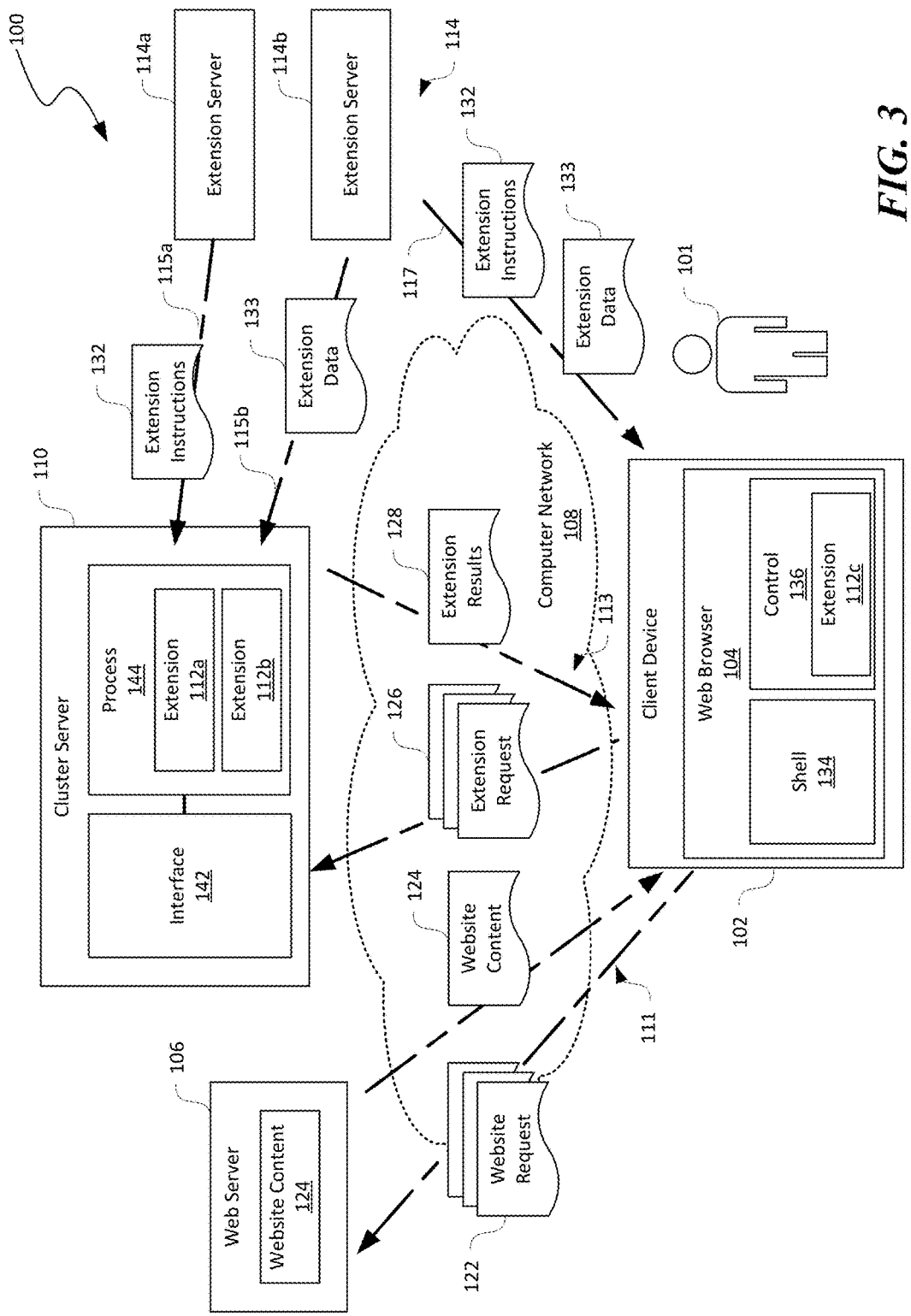
FIG. 3 is a schematic diagram showing certain components of the computing system in FIG. 1 in accordance with additional embodiments of the present technology.

FIG. 2 is a schematic diagram showing certain components of the computing system 100 in FIG. 1 in accordance with embodiments of the present technology. In FIG. 2 and in other figures hereinafter, similar references designate similar components. In addition, individual software components, objects, classes, modules, and routines may be a computer program, procedure, or process written as source code in C, C++, C#, Java, and/or other suitable programming languages.

A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). Components within a system may take different forms within the system. As one example, a system comprising a first component, a second component and a third component can, without limitation, encompass a system that has the first component being a property in source code, the second component being a binary compiled library, and the third component being a thread created at runtime.

The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware can be considered fossilized software, and software can be considered liquefied hardware. As just one example, software instructions in a component can be burned to a Programmable Logic Array circuit, or can be designed as a hardware circuit with appropriate integrated circuits. Equally, hardware can be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the web browser 104 on the client device 102 can include a shell component 134 and a control component 136. The shell component 134 can be configured to load a web page from a portal or other suitable website. For example, the shell component 134 can include a domain resolver (not shown) configured to determine an IP address of the web server 106 based on a user input (e.g., ""portal.azure.com"). The shell component 134 can also include a network interface configured to establish the network connection 111 between the client device 102 and the web server 106 based on the determined IP address. The shell component 134 can then be configured to transmit a website request 122 to and retrieve website content 124 (e.g., HTTP documents) from the web server 106. The shell component 134 can then display the retrieved website content 134 in the web browser 104.

The shell component 134 can also be configured to manage communications between the web browser 104 and any remotely executed extensions 112. For example, once remote execution is initiated, the shell component 134 can also be configured to transmit data associated with the one or more remotely executed extensions 112 to the cluster server 110. The transmitted data can include user input, data from the retrieved website content 124, data from one or more locally executed extensions, or other suitable types of data. The shell component 134 can also be configured to receive extension results 128 from the cluster server 110 and display the received execution results in the web browser 104.

The control component 136 can be configured to manage execution of one or more extensions 112 associated with a website displayed in the web browser 104. Two extensions 112 are shown in FIG. 2 for illustration purposes only. In other embodiments, the computing system 100 can be configured to remotely or locally execute any suitable number of extensions 112. In one embodiment, the control component 136 can receive a user input requesting remote execution of one or more extensions 122. In response, the control component 136 can establish the communications link 113 between the client device 102 and the cluster server 110 based on, for example, a hardcoded or user provided network address of the cluster server 110. The control component 136 can then transmit an extension request 126 to the cluster server 110 for executing the one or more extension on the cluster server 110. In other embodiments, the control component 136 can establish the communications link 133 and/or transmitting the extension request 126 for the one or more extensions upon, for instance, transmitting the website request 122, retrieving the website content 124, or based on other suitable criteria.

The control component 136 can also be configured to allow the user 101 to select between local or remote execution of one or more extensions. For example, in one embodiment, the control component 136 can provide a graphical user interface, a configuration file, or other suitable component that allows the user 101 to select a manner of execution for each of the extensions 122. In response to the user selection, the control component 136 can transmit the extension request 126 to the cluster server 110 requesting remote execution of extensions selected by the user 101. The control component 136 can also be configured to provision and execute one or more extensions locally on the client device 102, as described in more detail below with reference to FIG. 3.

Also shown in FIG. 2, the cluster server 110 can include an interface component 142 configured to receive an extension request 126 from the client device 102. The interface component 142 can then transmit the received extension request 126 to the process component 144 for further processing. The process component 144 can be configured to provision for and execute instructions associated with the one or more user-selected extensions. For example, the process component 144 can cause the cluster server 110 to initiate one or more virtual machines 111 (FIG. 1), download extension instructions 132 and other suitable configuration data from the extension servers 114, and execute the downloaded extension instructions 132 in, for instance, a browser emulator.

During execution of the extensions 112, the extensions 112 can also retrieve extension data 133 from the extension servers 114. The extensions 112 can then perform calculations or other suitable operations on the retrieved extension data 133 to generate extension results 128. The process component 144 can then be configured to forward the extension results 128 to the interface component 142, which in turn forwards the extension results 128 to the client device 102.

Even though FIG. 2 shows remote execution of all extensions 112, in certain embodiments, the user 101 can select one or more extensions 112 to be executed locally on the client device 102, for example, in an iFrame of the web browser 104 via a graphical user interface, a configuration file, or via other suitable indications. One example user interface suitable for receiving the user selection is described in more detail below with reference to FIG. 5. For instance, in the illustrated embodiment of FIG. 3, the user 101 can designate that first and second extensions 112a and 112b to be executed remotely, and a third extension 112c is to be executed locally on the client device 102. In response, the control component 136 can transmit the extension request 126 to the cluster server 110 to initiate execution of the first and second extensions 112a and 112b and displaying the extension results 128 in the web browser 104, as described above with reference to FIG. 2.

The control component 136 can also provision for and execute the third extension 112c locally. In one embodiment, the control component 136 can establish an extension link 117 with one or more of the extension servers 114 to retrieve the extension instructions 132 associated with the third extension 112c. In one embodiment, the extension link 117 can be separate from and can be different than the communications link 113. In other embodiments, the extension link 117 may be combined with the communications link 113. As such, the control component 136 can retrieve the extension instructions 132 and/or the extension data 133 from the extension servers 114 via the cluster server 110. The control component 136 can then cause execution of the downloaded extension instructions 132 in the web browser 104, for example, in an iFrame of the web browser 104. In other embodiments, execution of the third extension 112c can be isolate from other local extensions (not shown) using other suitable techniques.

Several embodiments of the computing system 100 can have improved execution flexibility when compared to conventional techniques. In certain embodiments, the user 101 can designate whether one or more particular extension is to be executed locally on the client device 102 or remotely on the cluster server 110. For example, when the user 101 is developing an extension 112, for ease of debugging, the user 101 can advantageously execute the extension 112 locally for readily modifying codes for the extension 112. In another example, when the extension 112 involves private or secure data, the user 101 can have the extension 112 executed locally to protect privacy. Thus, several embodiments of the computing system 100 can allow the user 101 to flexibly execute extensions 112 based on various preferences, network conditions, or other suitable criteria.

Figure 4:
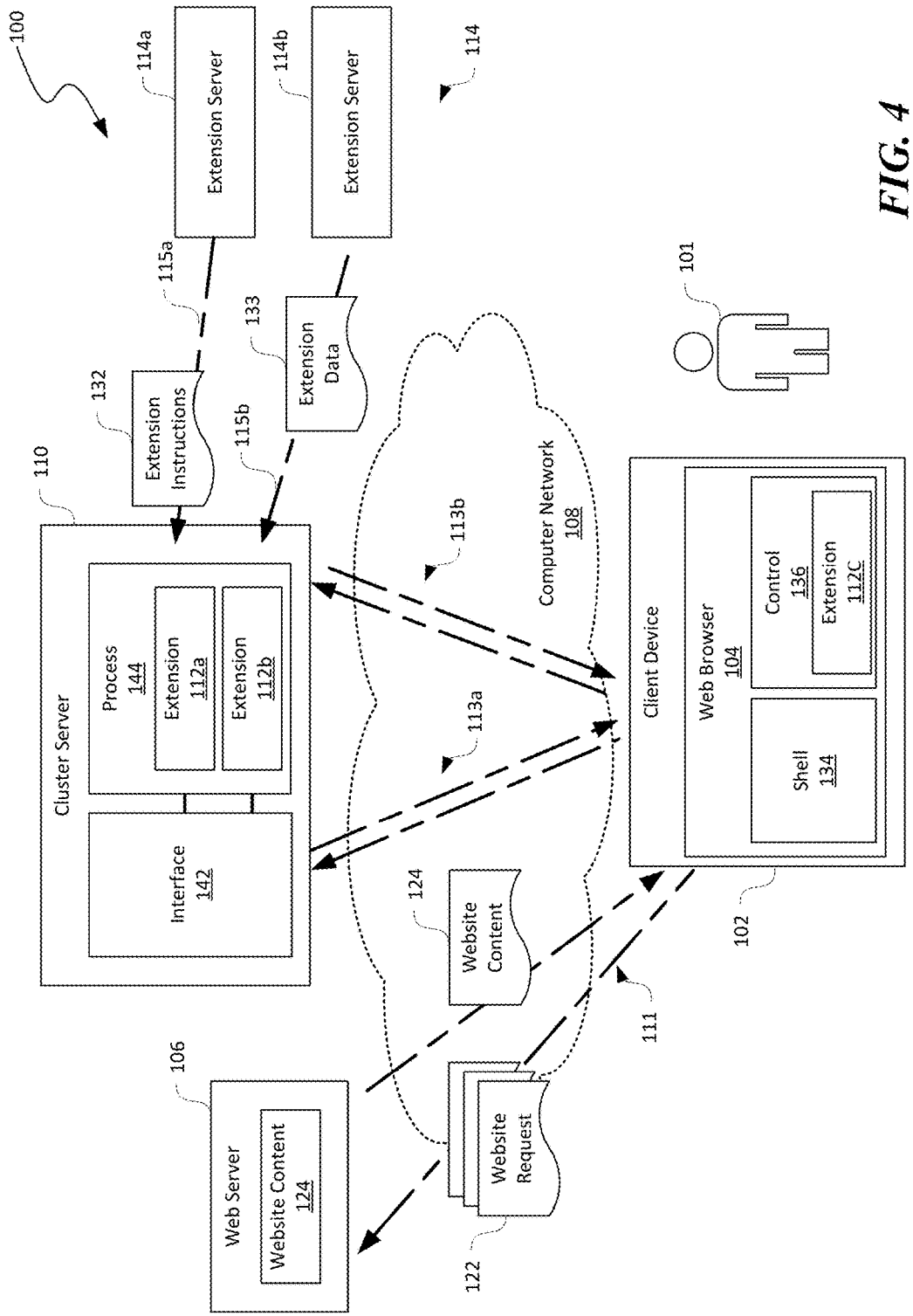
FIG. 4 is a schematic diagram showing certain components of the computing system in FIG. 1 in accordance with further embodiments of the present technology.

FIG. 4 is a schematic diagram showing certain components of the computing system 100 in FIG. 1 in accordance with further embodiments of the present technology. In FIGS. 1-3, the client device 102 is configured to establish a single communications link 133 for multiple remotely executed extensions 112 on the computing facility 108 (FIG. 1). However, in certain embodiments, the client device 102 can also be configured to establish multiple communications links 133 for the remotely executed extensions 112. For example, as shown in FIG. 4, the control component 136 can be configured to establish a first communications link 133a for the first extension 112a and a second communications link 133b for the second extension 112b. One feature of the foregoing embodiments is that the initiation, execution, and management of the individual extensions 112 can be isolated from one another. As such, execution reliability may be increased than utilizing a single communications link 133 for all or multiple extensions 112.

Figure 5:
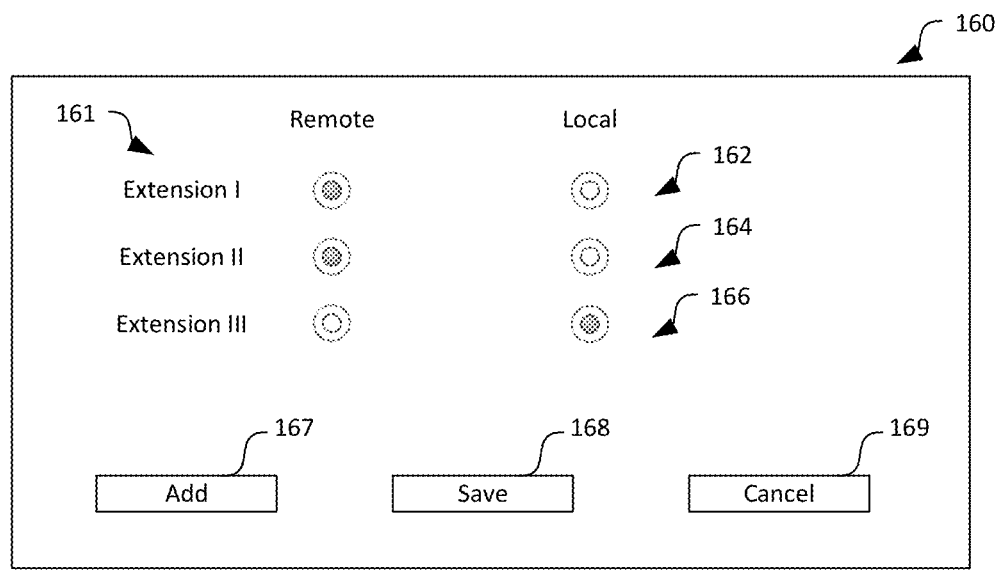
FIG. 5 is an example user interface for configuring execution of extensions in accordance with embodiments of the present technology.

FIG. 5 is an example user interface 160 for configuring execution of extensions in accordance with embodiments of the present technology. As shown in FIG. 5, the user interface 160 can include a list of extensions 161 (shown as Extension I, II, III) for illustration purposes. Each of the extensions can have an associated designator for receiving a remote or local execution designation for each of the extensions. In the illustrated embodiment, the designators 162, 164, and 166 are shown as radial buttons for illustration purposes. In other embodiments, the designators 162, 164, and 166 can individually include a dropdown list, a text input field, or other suitable types of input field. In the example shown in FIG. 5, the designators 162, 164, and 166 indicate that Extensions I and II are to be executed remotely, and Extension III is to be executed locally. In other embodiments, a user can select remote or local execution of the extensions in other suitable manners.

The user interface 160 can also include control features such as an add button 167, a save button 168, and a cancel button 169. The add button 167 can be configured to allow a user to add additional extensions. The save button 167 can be configured to allow a user to save changes to the selection entered in the input fields 162, 164, and 166. The cancel button 169 can be configured to cancel any changes to the selection entered in the input fields 162, 164, and 166. Even though particular input fields and control features are shown in FIG. 5, in other embodiments, the user interface 160 can include other suitable input fields and/or control features FIG. 6 is a flowchart showing a process 200 of distributed extension execution at a client device in accordance with embodiments of the present technology. Even though various embodiments of the process 200 are described below with reference to the computing system 100 of FIGS. 1-4, in other embodiments, the process 200 may be performed with other suitable types of computing frameworks, systems, components, or modules.

As shown in FIG. 6, the process 200 can include receiving a user input for accessing a website at stage 202, for example, via the web browser 104 on the client device 102 (FIG. 1). The process 200 can then include establishing a communications link with a cluster server 110 (FIG. 1) in a remote computing facility 108 (FIG. 1) at stage 204. In one embodiment, the communications link can be established when the web browser 104 is started on the client device 102. In another embodiment, the communications link can be established when the website content 124 (FIG. 2) is retrieved from the web server 106 and/or displayed in the web browser 104. In other embodiments, the communications link can be established when the user requests execution of an extension or at other suitable times.

The process 200 can then include a decision stage 206 to determine whether the communications link is established. In response to determining that the communications link is not established, the process 200 reverts to establishing the communications link at stage 204. In response to determining that the communications link is established, the process 200 proceeds to transmitting an extension request to the remote computing facility 108 to initiate one or more extensions at stage 208. The process 200 can then include receiving data representing extension results from executing the one or more extensions at stage 210. The received data can then be displayed in, for example, the web browser 104 on the client device 102.

Figures 7B, 7C:
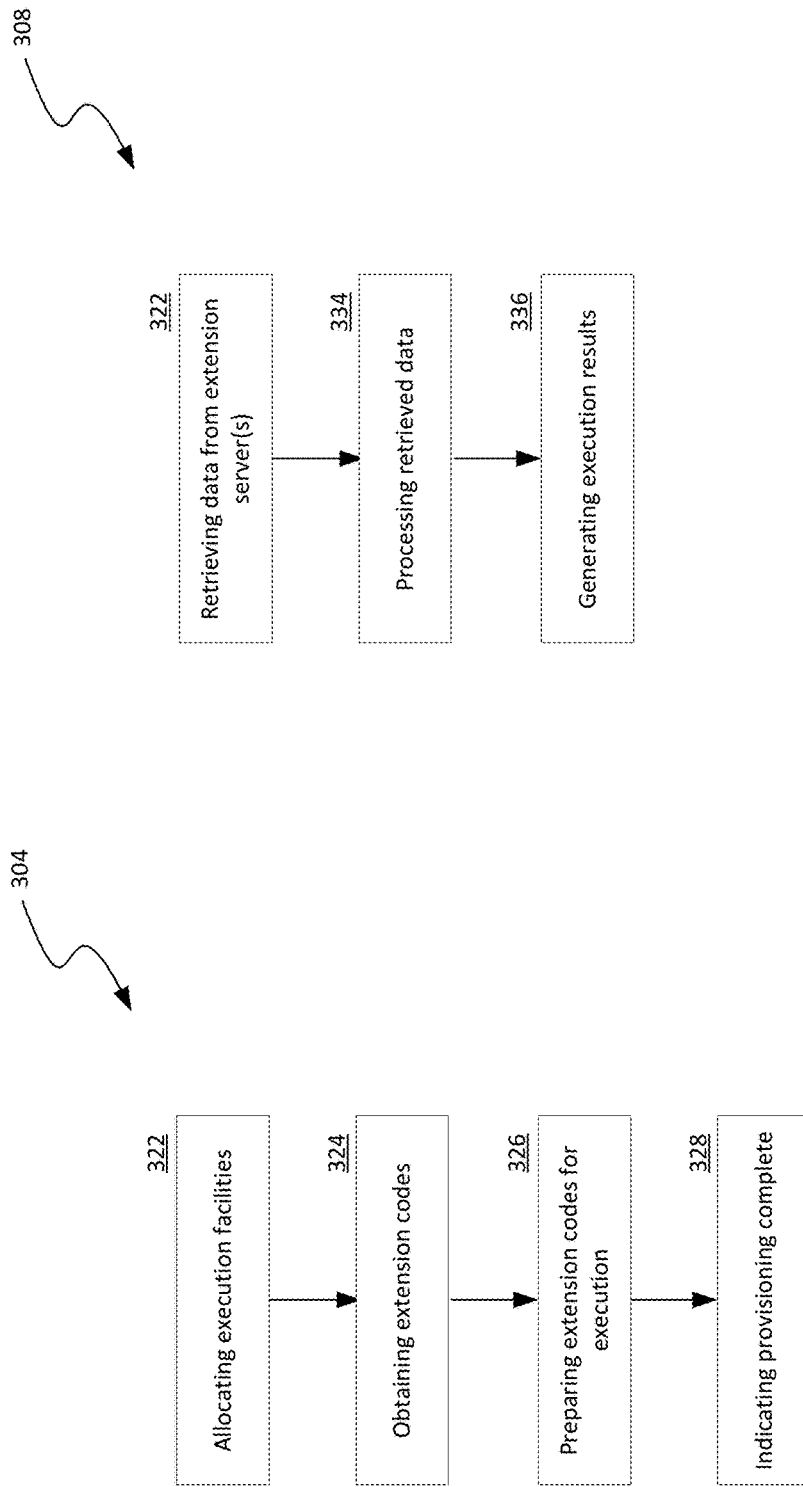

FIG. 7A is a flowchart showing a process 300 of distributed extension execution at a remote server in accordance with embodiments of the present technology. As shown in FIG. 7A, the process 300 can include receiving a request to initiate one or more extensions at stage 302. In response to the received request, the process 300 can include provisioning for executing the one or more extensions at stage 304. In certain embodiments, provisioning for executing the one or more extensions can include assigning the execution to a server (e.g., the cluster server 110 of FIG. 2), allocating computing and/or storage resources (e.g., available memory) to the server, and/or providing other suitable resources. In other embodiments, provisioning for executing the one or more extensions can include instantiating one or more virtual machines 111 (FIG. 1) to implement a browser emulator or other suitable applications suitable for executing the one or more extensions. In further embodiments, provisioning for executing the one or more extensions can include downloading or otherwise obtaining executable instructions for the requested one or more extensions from, for example, the extension server 114 of FIG. 1 or other suitable sources. Example embodiments of provisioning for executing the one or more extensions are described in more detail below with reference to FIG. 7B.

The process 300 can then include a decision stage 306 to determine whether provisioning for executing the one or more extensions is completed. In response to determining that provisioning is not completed, the process 300 reverts to provisioning for executing the one or more extensions at stage 304. In response to determining that provisioning is completed, the process 300 proceeds to executing the provisioned one or more extensions at stage 308. The process 300 can then include transmitting data representing results of executing the one or more extensions to the client device 102 (FIG. 1) at stage 310.

FIG. 7B is a flowchart showing a process 304 of provisioning for executing one or more extensions at a remote server in accordance with embodiments of the present technology. As shown in FIG. 7B, the process 304 can include allocating execution facilities at stage 322. In certain embodiments, allocating execution facilities can include allocating computing resources (e.g., processor time), storage space (e.g., available memory), or other suitable types of resources. In other embodiments, allocating facilities can also include assigning priorities to execution of the one or more extensions, and allocating resources accordingly.

The process 304 can then include obtaining extension codes or instructions at stage 324. In one embodiment, the extension codes or instructions can be obtained by downloading from one or more of extension servers 114 (FIG. 1). In another embodiment, the extension codes or instructions can be obtained by downloading from the web servers 106. In other embodiments, the extension codes or instructions can be obtained by downloading from a network storage or other suitable sources.

The process 304 can also include preparing extension codes for execution at stage 326. In one embodiment, preparing extension codes for execution can include checking for compatibility of the extension codes to other components of the allocated computing facilities. In other embodiments, preparing extension codes for execution can also include configuring downloaded extension codes or performing other suitable operations. The process 304 can then include indicating that provisioning for executing the one or more extensions is completed at stage 328.

FIG. 7C is a flowchart showing a process 308 of executing one or more extensions at a remote server in accordance with embodiments of the present technology. As shown in FIG. 7C, the process 308 can include retrieving data from one or more extension servers 114 (FIG. 1) to be processed by the one or more extensions. Example data can include operating parameters (e.g., CPU usage, available storage volume, etc.), event logs, fault reports, or other suitable information associated with a website.

The process 308 can also include processing the retrieved data at stage 334. In certain embodiments, processing the retrieved data can include performing one or more calculations on the retrieved data. In other embodiments, processing the retrieved data can also include comparing, searching, or performing other suitable logic operations on the retrieved data. In further embodiments, processing the retrieved data can include generating data of a graphical representation of the retrieved data. In yet further embodiments, processing the retrieved data can include sorting, filtering, or other suitable operations.

Figure 8:
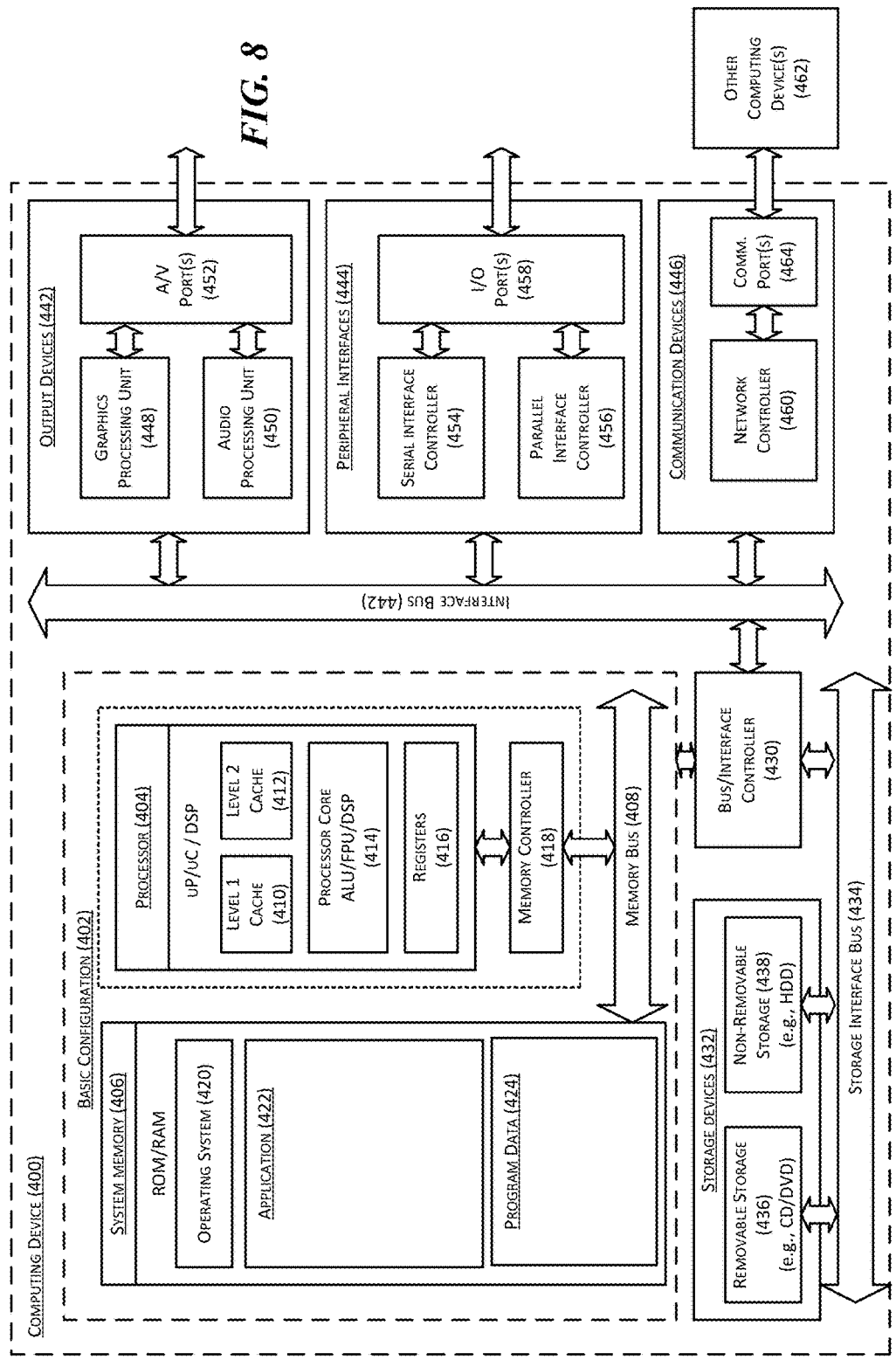
FIG. 8 is a computing device suitable for certain components of the computing system in FIGS. 1-4.

FIG. 8 is a computing device 400 suitable for certain components of the computing system in FIGS. 1-4. For example, the computing device 400 may be suitable for the client device 102, website server 106, a cluster server 110, or an extension server 114 of FIG. 2. In a very basic configuration 402, computing device 400 typically includes one or more processors 404 and a system memory 406. A memory bus 408 may be used for communicating between processor 404 and system memory 406.

Depending on the desired configuration, the processor 404 may be of any type including but not limited to a microprocessor (µP), a microcontroller (µC), a digital signal processor (DSP), or any combination thereof. The processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, the system memory 406 may be of any type including but not limited to volatile memory (such as RAM), non-volatile memory (such as ROM, flash memory, etc.) or any combination thereof. The system memory 406 can include an operating system 420, one or more applications 422, and program data 424. This described basic configuration 402 is illustrated in FIG. 6 by those components within the inner dashed line.

The computing device 400 may have additional features or functionality, and additional interfaces to facilitate communications between basic configuration 402 and any other devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, removable storage devices 436, and non-removable storage devices 438 are examples of computer readable storage media. Computer readable storage media include storage hardware or device(s), examples of which include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 400. Any such computer readable storage media may be a part of computing device 400. The term "computer readable storage medium" excludes propagated signals and communication media.

The computing device 400 may also include an interface bus 440 for facilitating communication from various interface devices (e.g., output devices 442, peripheral interfaces 444, and communication devices 446) to the basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for distributed extension execution, comprising:
   receiving a user input at a client device for initiating an extension in a web browser, the extension being associated with a website and including a computer program having codes that extend functionality of the website; and
   in response to the received user input,
      determining whether the requested extension is to be executed locally on the client device or remotely; and
      in response to determining that the requested extension is to be executed remotely,
         establishing a communications link between the client device and a remote computing facility via a computer network;
         transmitting a request for initiating the extension from the client device to the remote computing facility via the established communication link; and
         receiving, at the client device, data representing execution results of the requested extension from the remote computing facility.

2. The method of claim 1, further comprising displaying, at the client device, the received data representing the execution results of the requested extension in the web browser without executing the requested extension on the client device.

3. The method of claim 1 wherein the user input is a first user input, and wherein the method further includes:
   receiving, at the client device, a second user input associated with the extension to be executed by the remote computing facility; and
   transmitting the received second user input to the remote computing facility via the established communications link.

4. The method of claim 1 wherein receiving the user input includes receiving the user input having a designator indicating whether the requested extension is to be executed locally on the client device or by the remote computing facility, and wherein determining whether the requested extension is to be executed locally on the client device or remotely further includes determining whether the requested extension is to be executed locally on the client device or remotely in accordance with the designator.

5. The method of claim 1 wherein:
   receiving the user input includes receiving the user input having a designator indicating whether the requested extension is to be executed locally on the client device or by the remote computing facility; and
   determining whether the requested extension is to be executed locally on the client device or remotely includes:
      determining whether the requested extension is to be executed locally on the client device or remotely by the remote computing facility according to the associated designator; and
      in response to determining that the requested extension is to be executed remotely, transmitting the request for initiating the extension from the client device to the remote computing facility via the established communication link.

6. The method of claim 1 wherein:
the requested extension is a first extension; and
the method further includes:
   receiving another user input at the client device for initiating a second extension in the web browser, the another user input having a designator indicating whether the second extension is to be executed locally on the client device or by the remote computing facility;
   determining whether the second extension is to be executed locally on the client device or by the remote computing facility according to the associated designator; and in response to determining that the requested extension is to be executed locally, provisioning for and executing the second extension in the web browser on the client device.

7. A method for distributed extension execution, comprising:
receiving, at a computing facility having a plurality of servers, a request from a client device via a computer network for initiating an extension associated with a website accessed by the client device via a web browser;
in response to the received request, provisioning for execution of the extension at the computing facility including:
initiating a virtual machine on one of the servers of the computing facility; and
downloading computer codes corresponding to the extension from an extension server;
executing the extension at the computing facility to generate data representing execution results of the extension including:
initiating the downloaded computer codes corresponding to the extension within the virtual machine;
retrieving extension data from the extension server; and
processing the retrieved data at the virtual machine to generate the data representing execution results of the extension; and
transmitting the generated data representing execution results of the extension to the client device to be displayed in the web browser on the client device.

8. The method of claim 7 wherein:
receiving the request includes receiving the request via a communications link between the client device and the computing facility;
executing the extension includes retrieving extension data from an extension server via an extension link between the computing facility and the extension server; and
the extension link being separate from and different than the communications link between the client device and the computing facility.

9. The method of claim 7 wherein:
receiving the request includes receiving the request via a communications link between the client device and the computing facility;
executing the extension includes retrieving extension data from an extension server via an extension link between the computing facility and the extension server; and
transmitting the generated data includes transmitting the generated data representing execution results of the extension to the client device via the communications link.

10. The method of claim 7 wherein:
receiving the request includes receiving the request via a communications link between the client device and the computing facility;
executing the extension includes retrieving extension data from an extension server via an extension link between the computing facility and the extension server; and
transmitting the generated data includes transmitting the generated data representing execution results of the extension to the client device via the communications link that is separate from the extension link.

11. The method of claim 7 wherein:
the executed extension is a first extension; and
the method further includes:
receiving, at the computing facility, another request from the client device via the computer network for initiating a second extension associated with the website accessed by the client device via the web browser;
in response to the received request, provisioning for execution of the second extension at the computing facility;
executing the second extension at the computing facility to generate data representing execution results of the second extension; and
transmitting the generated data representing execution results of the second extension to the client device to be displayed in the web browser on the client device along with the received data representing execution results of the first extension.

12. A computer system for distributed extension execution, comprising:
a processor and a memory containing instructions executable by the processor to cause the computing system to:
receive, at the computer system, a request from a client device via a computer network for initiating and executing an extension associated with a website, the extension being configured to extend functionality of the website having one or more webpages displayed on the client device;
in response to the received request, provision for and execute the extension with the processor to generate data representing execution results of the extension, wherein:
to provision for execution of the requested extension includes to:
initiate a virtual machine on one of the servers of the computing facility; and
download computer codes corresponding to the extension from an extension server; and
to execute the extension includes to:
initiate the downloaded computer codes corresponding to the extension within the virtual machine;
retrieve extension data from the extension server; and
process the retrieved data at the virtual machine to generate the data representing execution results of the extension; and
transmit the generated data representing execution results of the extension from the computer system to the client device via the computer network to be outputted on the one or more webpages displayed on the client device without executing the extension on the client device.

13. The computer system of claim 12 wherein:
to receive the request includes to receive the request via a communications link between the client device and the computing facility;
to execute the extension includes to retrieve extension data from an extension server via an extension link between the computing facility and the extension server; and
to transmit the generated data includes to transmit the generated data representing execution results of the extension to the client device via the communications link.

14. A method for distributed extension execution, comprising:
receiving, at a computing facility having a plurality of servers, a request from a client device via a computer network for initiating an extension associated with a website accessed by the client device via a web browser;

in response to the received request, provisioning for execution of the extension at the computing facility including:
- initiating a virtual machine on one of the servers of the computing facility; and
- downloading computer codes corresponding to the extension from an extension server; and executing the extension at the computing facility to generate data representing execution results of the extension including:
- instantiating a browser emulator within the virtual machine;
- initiating the downloaded computer codes corresponding to the extension in the instantiated browser emulator;
- retrieving, using the browser emulator, extension data from the extension server; and
- processing the retrieved data at the virtual machine to generate the data representing execution results of the extension; and transmitting the generated data representing execution results of the extension to the client device to be displayed in the web browser on the client device.

15. The method of claim 14 wherein:
receiving the request includes receiving the request via a communications link between the client device and the computing facility;
executing the extension includes retrieving extension data from an extension server via an extension link between the computing facility and the extension server; and
the extension link being separate from and different than the communications link between the client device and the computing facility.

16. The method of claim 14 wherein:
receiving the request includes receiving the request via a communications link between the client device and the computing facility;
executing the extension includes retrieving extension data from an extension server via an extension link between the computing facility and the extension server; and
transmitting the generated data includes transmitting the generated data representing execution results of the extension to the client device via the communications link.

17. The method of claim 14 wherein:
receiving the request includes receiving the request via a communications link between the client device and the computing facility;
executing the extension includes retrieving extension data from an extension server via an extension link between the computing facility and the extension server; and
transmitting the generated data includes transmitting the generated data representing execution results of the extension to the client device via the communications link that is separate from the extension link.

18. The method of claim 14 wherein:
the executed extension is a first extension; and
the method further includes:
- receiving, at the computing facility, another request from the client device via the computer network for initiating a second extension associated with the website accessed by the client device via the web browser;
- in response to the received request, provisioning for execution of the second extension at the computing facility;
- executing the second extension at the computing facility to generate data representing execution results of the second extension; and
- transmitting the generated data representing execution results of the second extension to the client device to be displayed in the web browser on the client device along with the received data representing execution results of the first extension.

19. A method for distributed extension execution, comprising:
receiving, at a computing facility having a plurality of servers and from a client device via a computer network, a first request for initiating a first extension associated with a website accessed by the client device via a web browser and a second request from the client device via the computer network for initiating a second extension associated with the website accessed by the client device via the web browser; and
in response to the received first and second requests,
- provisioning for execution of the first and second extensions at the computing facility;
- executing the first and second extensions at the computing facility to generate data representing execution results of the first and second extension, respectively; and
- transmitting the generated data representing execution results of the first extension to the client device to be displayed in the web browser on the client device along with the received data representing execution results of the second extension.

20. The method of claim 19 wherein:
provisioning for execution of the requested extension includes downloading computer codes corresponding to the first and second extensions, respectively, from an extension server; and
executing the first and second extensions includes:
- retrieving extension data from the extension server; and
- processing the retrieved data at the computing facility to generate the data representing execution results of the first and second extensions.

* * * * *